United States Patent
Funayama

(10) Patent No.: US 11,921,829 B2
(45) Date of Patent: Mar. 5, 2024

(54) COMMUNICATION APPARATUS, CONTROL METHOD THEREFOR, AND STORAGE MEDIUM

(71) Applicant: CANON KABUSHIKI KAISHA, Tokyo (JP)

(72) Inventor: Hirotaka Funayama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 324 days.

(21) Appl. No.: 17/519,205

(22) Filed: Nov. 4, 2021

(65) Prior Publication Data

US 2022/0147600 A1 May 12, 2022

(30) Foreign Application Priority Data

Nov. 10, 2020 (JP) ................................. 2020-187609

(51) Int. Cl.
    *G06F 15/16* (2006.01)
    *G06F 21/30* (2013.01)
    *H04L 67/02* (2022.01)

(52) U.S. Cl.
    CPC ............ *G06F 21/305* (2013.01); *H04L 67/02* (2013.01)

(58) Field of Classification Search
    CPC .................................. G06F 21/305; H04L 67/02
    USPC ................................................................ 726/3
    See application file for complete search history.

(56) References Cited

U.S. PATENT DOCUMENTS

| 2011/0185183 A1* | 7/2011 | Yamamoto | G06F 21/35 726/17 |
| 2018/0011973 A1* | 1/2018 | Fish | A61B 5/1176 |
| 2019/0034607 A1* | 1/2019 | Funayama | H04L 63/102 |
| 2019/0173679 A1* | 6/2019 | Hennessy | H04L 9/3263 |

FOREIGN PATENT DOCUMENTS

JP         2012133489 A       7/2012

* cited by examiner

*Primary Examiner* — Suraj M Joshi
*Assistant Examiner* — Joel Mesa
(74) *Attorney, Agent, or Firm* — Canon U.S.A., Inc. IP Division

(57) ABSTRACT

A communication apparatus includes at least one memory that stores a set of instructions, and at least one processor that executes the instructions, the instructions, when executed, causing the communication apparatus to perform operations including verifying, by communicating with an external device, whether the external device is an external device that passed a predetermined certification, and displaying a screen for selecting an authenticator, wherein on the screen, a display item for an external authenticator verified as the external device that passed the predetermined certification and a display item for an external authenticator that failed to be verified as the external device that passed the predetermined certification are displayed in a distinguishable manner based on a result of the verification.

10 Claims, 11 Drawing Sheets

FIG.5A

| DEVICE ID | CONNECTION METHOD | CONNECTION METHOD 2 | TYPE | PREDETERMINED AUTHENTICATION |
|---|---|---|---|---|
| 3f21a897-0a85-4c58-b48c-85812890b35b | Bluetooth® | SESSION 1 | AUTHENTICATOR | OK |
| 2ae22ccf-e94d-4d65-b767-2366728b62e9 | Bluetooth® LE | Available | AUTHENTICATOR | N/A |
| c89dc73e-4496-4d1b-bee0-c821a08ebccd | Bluetooth® | SESSION 2 | AUDIO DEVICE | OK |
| e00d11b2-51ed-4534-8111-462780647857 | Bluetooth® | N/A | AUDIO DEVICE | NG |
| 61f20e68-db1d-46d0-97ce-8bab3f3bb02d | Bluetooth® | N/A | KEYBOARD | OK |
| 4e332c46-e8e3-4f1a-aa76-73ee78413ac8 | USB | N/A | AUTHENTICATOR | OK |
| 81fabc05-73d7-2f22-f2a8-b16e0c0b0370 | USB | Port 1 | AUTHENTICATOR | NG |
| ... | ... | ... | ... | ... |

FIG.5B

| DEVICE ID | CONNECTION METHOD | CONNECTION METHOD 2 | PREDETERMINED AUTHENTICATION |
|---|---|---|---|
| 3f21a897-0a85-4c58-b48c-85812890b35b | Bluetooth® | SESSION 1 | OK |
| 2ae22ccf-e94d-4d65-b767-2366728b62e9 | Bluetooth® LE | Available | N/A |
| 4e332c46-e8e3-4f1a-aa76-73ee78413ac8 | USB | N/A | OK |
| 81fabc05-73d7-2f22-f2a8-b16e0c0b0370 | USB | Port 1 | NG |
| Internal | Internal Bus | — | — |
| ... | ... | ... | ... |

COMMUNICATION APPARATUS, CONTROL METHOD THEREFOR, AND STORAGE MEDIUM

BACKGROUND

Field

The present disclosure relates to a communication apparatus that uses an authenticator, a control method for the communication apparatus, and a storage medium.

Description of the Related Art

In recent years, Fast Identity Online (FIDO®) has received a lot of attention as a new online authentication system.

In FIDO® authentication, a private key and credential information, such as information for biometric authentication and a passcode for unlocking, are stored in association with each other in an authenticator owned by a user. Then, local authentication is performed by biometric authentication, passcode authentication, or the like using the authenticator. In a case where the local authentication is successful, the user signs a challenge received from a server using a private key and sends a result of the authentication with a signature to an online service. The online service verifies the result of the authentication with the signature using a public key registered in pre-registration processing, and determines whether the user has a valid authority. This procedure makes it possible to perform an online authentication without exchanging a user credential, such as a password, on an online communication channel.

Recent communication apparatuses, such as smartphones, are connected with various peripheral devices (also referred to as accessories) using, for example, Bluetooth® or an interface, such as a universal serial bus (USB). Japanese Patent Application Laid-Open No. 2012-133489 discusses a mechanism in which when an accessory is connected to a communication apparatus, such as a smartphone, a display mode for a content is varied in accordance with an identifier for the accessory and a sensor obtained orientation of the communication apparatus.

Authentication-related specifications for online authentication systems, such as FIDO®, have been available to the public. Based on the public specifications, various vendors have developed and sold external authenticators as accessories to be used by being connected to a communication terminal using USB connection, Bluetooth® connection, or the like.

SUMMARY

According to one embodiment of the present disclosure, a communication apparatus includes a verification unit configured to verify, by communicating with an external device, whether the external device is an external device that passed a predetermined certification, and a display unit configured to display a screen for selecting an authenticator, wherein on the screen, a display item for an external authenticator verified as the external device that passed the predetermined certification and a display item for an external authenticator that failed to be verified as the external device that passed the predetermined certification are displayed in a distinguishable manner based on a result of the verification performed by the verification unit.

Further features of the present disclosure will become apparent from the following description of example embodiments with reference to the attached drawings.

BRIEF DESCRIPTION OF THE DRAWINGS

FIGS. 5A and 5B are tables each illustrating an example of a device management table according to one embodiment.

DESCRIPTION OF THE EMBODIMENTS

Example embodiments for carrying out features of the present disclosure will be described below with reference to the drawings. The following example embodiments are not intended to limit the invention described in the claims. Further, not all combinations of features described in the example embodiments are essential to the solving means of each embodiment of the present disclosure.

As described above, in recent years, various vendors have developed and sold external authenticators as accessories that are used by being connected to a communication terminal using universal serial bus (USB) connection, Bluetooth® connection, or the like.

In general, accessories that are guaranteed in terms of safety, compatibility, stability, and the like can enhance experience of a user using a communication apparatus connected with the accessories. On the other hand, accessories that are not guaranteed in terms of safety, compatibility, stability, and the like can deteriorate experience of the user using the communication apparatus.

In view of the above-described circumstances, some vendors of operating systems (OSs) of communication apparatuses individually have predetermined certification programs for operation checking and examination in terms of safety, compatibility, stability, and the like. An external device having passed the predetermined certification program is given a certification logo indicating that predetermined performance criteria specified by a vendor of the external device are satisfied. The external device having passed the predetermined certification program is provided with a module that is for communicating with the OS of the communication apparatus and to be used for verification of whether the external device is a device having passed the predetermined certification program.

Many users may wish to use guaranteed accessories for external authenticators that hold important data, such as a credential, including biometric information, and a private key.

In view of the above-described assumption, an example embodiment of the present disclosure provides a mechanism for presenting an external authenticator that has not passed a predetermined certification program to a user in a recognizable way. Specifically, when a user uses an external authenticator, a display control operation is performed to facilitate identification of an external authenticator failed to pass a predetermined authentication.

Figure 1:
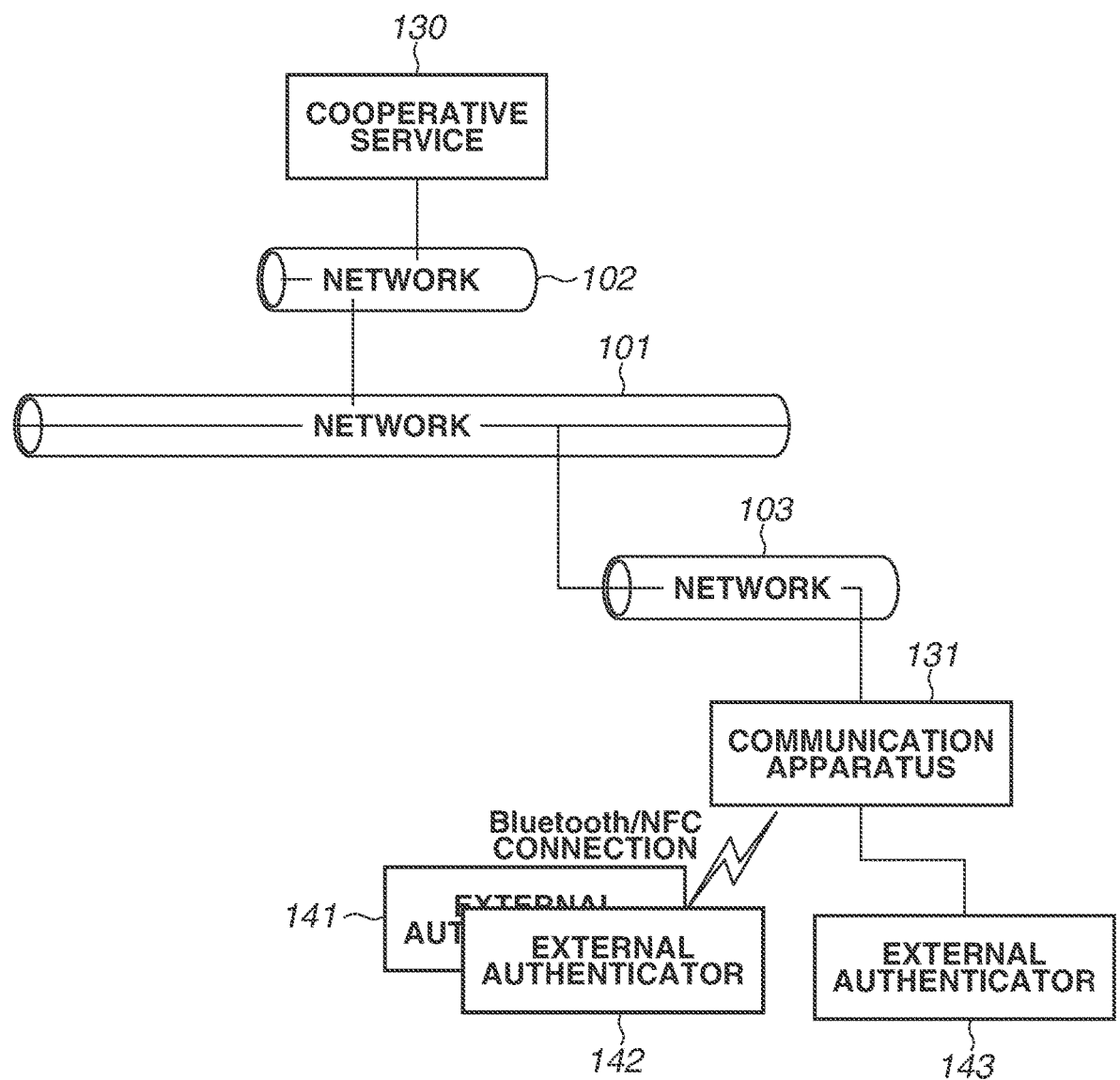
FIG. 1 illustrates an example of an online authentication system according to a first example embodiment.

Referring first to FIG. 1, a configuration example of an online authentication system according to a first example embodiment will be described. The online authentication system according to the present example embodiment includes a communication apparatus 131, external authenticators 141 to 143, and a cooperative service 130. The communication apparatus 131 and the cooperative service 130 are connected to communicate with each other via networks 101 to 103. The networks 101 to 103 may be configured using a combination of, for example, a communication network, such as a local area network (LAN) or a wide area network (WAN), a public wireless communication network (e.g., Long Term Evolution (LTE) or 5-Generation (G)), a wireless network compliant with Institute of Electrical and Electronics Engineers (IEEE) 802.11 standards, and the like. In other words, any physical layer communication method may be employed as long as the networks 101 to 103 can transmit and receive data.

In the present example embodiment, a description will be given of a case where the communication apparatus 131 is a laptop personal computer (PC), a tablet terminal, a smartphone, or the like. However, the present invention is not limited to this case. Embodiments of the present disclosure can also be applied to an online authentication using a communication apparatus, such as a smart glass or a virtual reality (VR) headset device.

The communication apparatus 131 includes a web browser application and a communication application for communicating with a web system. The communication apparatus 131 can operate in cooperation with the external authenticators 141 to 143 and the cooperative service 130 that is available online and can perform user authentication processing.

The communication apparatus 131 will be described in more detail. A user of the communication apparatus 131 has a user account on the cooperative service 130. The user uses the web browser application of the communication apparatus 131 to access a website of the cooperative service 130, and sends an authentication request to the website using the user account (a user identification (ID) and a password). Consequently, the user can log in to the website.

When the user successfully log in to the website, the user can use various functions of the cooperative service 130 and access data on the cooperative service 130 through the web browser application of the communication apparatus 131.

The authentication processing can be executed in accordance with, for example, the specifications of Fast Identity Online (FIDO®) WebAuthn developed by FIDO® Alliance. A control operation that is associated with an online authentication and is executed between each of the external authenticators 141 to 143 and the communication apparatus 131 is executed in accordance with the specifications of Client To Authenticator Protocol (CTAP). A series of online authentication processes using WebAuthn and CTAP are hereinafter referred to as "FIDO2 authentication".

Verification of whether the external device is a device having passed authentication of an OS running on the communication apparatus 131 is executed in accordance with specifications developed by a vendor of the OS.

The cooperative service 130 is a network service that is implemented using server computer resources. The cooperative service 130 releases an application program interface (API) in accordance with the above-described specifications of WebAuthn for applications of communication apparatuses and the like. The cooperative service 130 provides a content including a program that runs on a web browser, such as JavaScript®, in response to a request from a client application, such as the web browser application included in the communication apparatus 131 or the like. Programs running on the web browser, including JavaScript®, are interpreted by an interpreter (also referred to as a script engine) included in the web browser. The program interpreted by the interpreter operates as a web application for calling, as needed, the API provided by the cooperative service 130. The web application provides a control operation related to the FIDO2 authentication on the communication apparatus 131, and a control operation related to a display screen on a browser.

The external authenticators 141 to 143 are external authenticators that can be used by the user to execute an online authentication with a service, such as the cooperative service 130. The external authenticators 141 to 143 include an authentication function and may have any shape such as a dongle, a key strap, or a ring-shaped device. Alternatively, the external authenticators 141 to 143 may be smartphones or the like different from the communication apparatus 131.

Each of the external authenticators 141 to 143 is connected to the communication apparatus 131 by wireless communication or wired communication, and verifies a personal identity of the user of the communication apparatus 131. In the present example embodiment, a description will be given of an example case where the external authenticators 141 to 143 can perform biometric authentication using a fingerprint, iris, or the like and can also implement multi-factor authentication using possession authentication and biometric authentication. However, the present invention is not limited to this example. For example, the external authenticators 141 to 143 may not include a biometric authentication function and may implement multi-factor authentication by combining possession authentication and knowledge authentication using a passcode or the like.

In the present example embodiment, the external authenticator 143 includes a USB interface and is used by being physically connected to the communication apparatus 131. While the USB interface is used as an example of an interface for physical connection, the interface is not limited to this example. For example, any interface such as Lighting® may be used as a connection interface.

The external authenticators 141 and 142 are examples of the authenticators that communicate with the communication apparatus 131 by near-field wireless communication using, for example, Bluetooth® and Bluetooth® Low Energy.

The communication method for establishing a communication between each of the external authenticators 141 to 143 and the communication apparatus 131 is not limited to this example. For example, any physical layer communication method, such as ultra wide band (UWB) wireless communication and near-field communication (NFC) wireless communication, may be employed.

Hardware Configuration of Communication Apparatus 131

Figure 2:
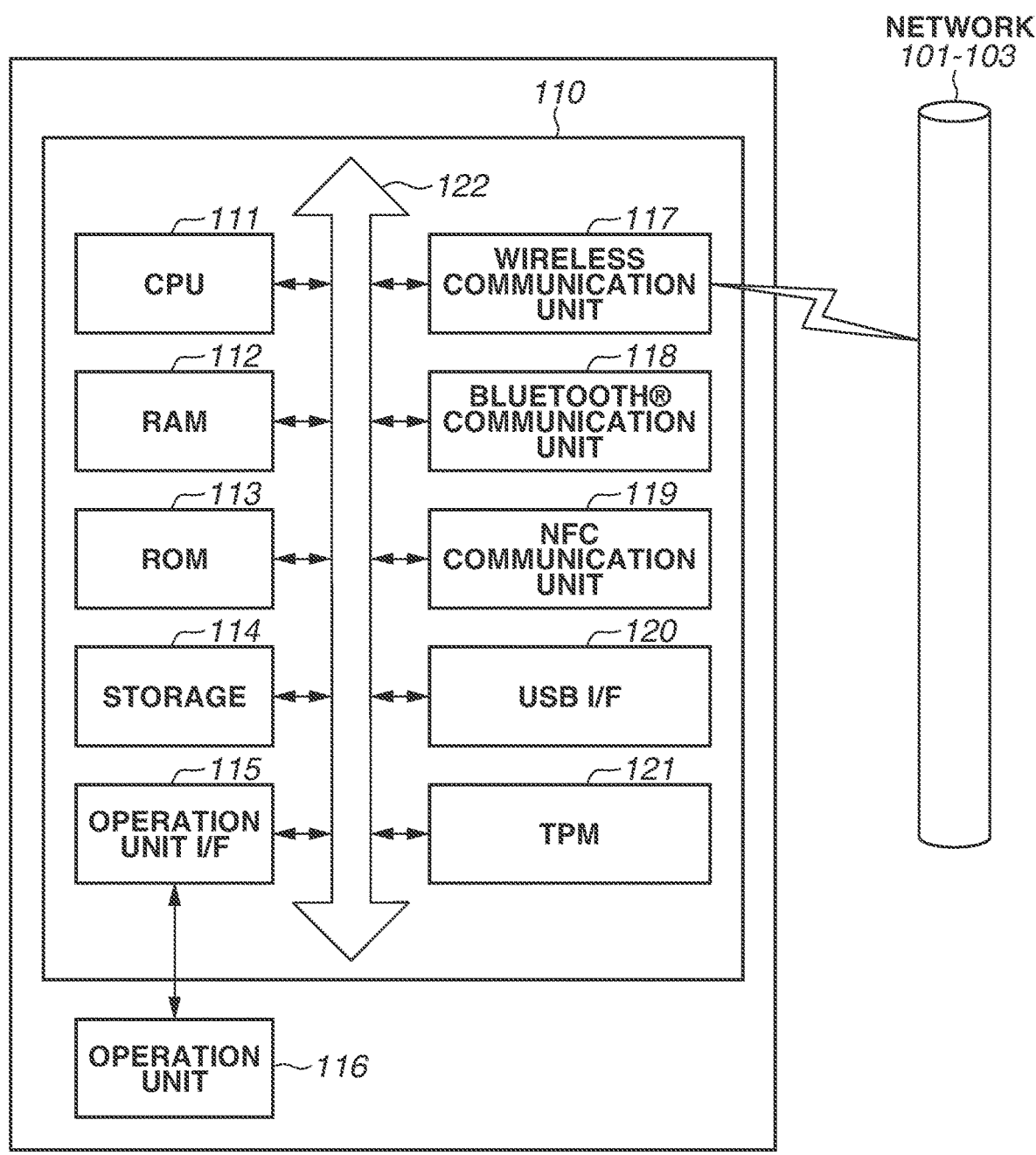
FIG. 2 is a block diagram illustrating a hardware configuration example of a communication apparatus according to one embodiment.

Next, a hardware configuration example of the communication apparatus 131 according to the present example embodiment will be described with reference to FIG. 2. FIG. 2 is a block diagram illustrating a hardware configuration example of the communication apparatus 131.

A control unit 110 including a central processing unit (CPU) 111 controls the overall operation of the communication apparatus 131. Hardware modules and interfaces included in the control unit 110 are connected to a system bus 122 to communicate with each other. The CPU 111 reads out control programs stored in a read-only memory (ROM) 113 or a storage 114, and performs various control operations such as a printing control operation and a reading control operation. The ROM 113 stores control programs that can be executed by the CPU 111. A random access memory (RAM) 112 is a main storage memory that is accessed by the CPU 111 and is used as a temporary storage area for loading a work area or various control programs. The storage 114 is a non-volatile flash memory having a larger capacity than the RAM 112. The storage 114 stores control programs for the communication apparatus 131. The storage 114 also stores an OS 405 and a web browser application 401 to be described below.

The CPU 111 executes a boot program stored in the ROM 113 upon start-up of the communication apparatus 131. The boot program is used to read out the program of the OS 405 stored in the storage 114 and to load the program on the RAM 112. When the CPU 111 executes the boot program, the CPU 111 executes the program of the OS 405 loaded on the RAM 112 to control the communication apparatus 131. The CPU 111 also loads various data on the RAM 112 to read and write data.

In the above described manner, the hardware modules, such as the CPU 111, the ROM 113, the RAM 112, and the storage 114, are included in a so-called computer.

The communication apparatus 131 has a configuration in which a single processor, the CPU 111, executes each process illustrated in flowcharts to be described below. However, the communication apparatus 131 is not limited to this configuration, and may have any other configuration. For example, a plurality of processors and memories may be caused to operate in cooperation to execute each process illustrated in the flowcharts to be described below. Some of the processes, such as data transmission and reception processes, are implemented using a hardware circuit and the like that are included in a communication interface and operate in cooperation.

An operation unit interface (I/F) 115 connects the control unit 110 and an operation unit 116 to each other. The operation unit 116 includes a touch panel capable of detecting a touch operation by the user, and a display panel on which various screens are displayed. The operation unit 116 functions as a display unit for displaying information and as a reception unit for receiving an instruction from the user. On the operation unit 116, various screens provided by the OS 405 and the web browser application 401 are displayed. The user performs a touch operation using an object, such as a finger, on the operation unit 116, to input a desired operation instruction to the communication apparatus 131.

The operation unit 116 also includes hardware keys, such as a volume button and a power supply button. The user can also input an operation instruction to the communication apparatus 131 by pressing the hardware keys.

Next, a communication interface used for communication with the cooperative service 130 will be described. A wireless communication unit 117 is connected to an access point compliant with the IEEE 802.11 standards, and includes a wireless client function for establishing a wireless communication with an external device. The wireless communication unit 117 also includes a function for communicating with a base station of a mobile communication system using, for example, LTE or 5G, and establishing a wireless communication with an external device via the base station.

The communication apparatus 131 transmits and receives data to and from an external device or an external service connected to the networks 101 to 103 or the like via the wireless communication unit 117.

Next, an interface that is used for communication with the external authenticators 141 to 143 will be described.

A Bluetooth® communication unit 118 is an interface for transmitting and receiving data to and from various peripheral devices by near-field wireless communication. The control unit 110 uses wireless communication compliant with Bluetooth® or Bluetooth® Low Energy to communicate with peripheral devices such as the external authenticators 141 to 143. Connection and device search methods will be described below.

An NFC communication unit 119 communicates with various peripheral devices, such as the external authenticators 141 to 143, by the near-field wireless communication method developed by the International Organization for Standardization (ISO) and International Electrotechnical Commission (IEC) 14443 Type A/B or ISO/IEC 18092. The NFC communication unit 119 establishes a near-field wireless communication with external authenticators being in proximity to an NFC antenna portion (not illustrated) of the communication apparatus 131, and exchanges information with the external authenticators.

A USB I/F 120 is an interface for directly connecting to peripheral devices by USB communication. In the present example embodiment, a physical port for connecting a USB Type-C connector is provided on a side surface of a casing of the communication apparatus 131. The user can connect the external authenticator 143, which is a USB-type external authenticator, to the physical port. When the external authenticator 143 is connected, the OS 405 identifies the external authenticator 143 as an external authenticator connected via a USB and performs automatic configuration processing for a control driver or the like so that the functions provided by the external authenticator 143 can be utilized by the OS 405 and the web browser application 401.

A Trusted Platform Module (TPM) 121 is a storage unit intended for processing and storing confidential information and thus has tamper-resistance for preventing stored data from being externally read. In the present example embodiment, a certificate that is used for a private key and communication with the cooperative service 130 is stored. Encryption and decryption of data using a certificate or a key, generation of a key pair, calculation of a hash value, digital signature generation processing, verification processing, and the like are also executed by the TPM 121 and the CPU 111 that operate in cooperation. The TPM 121 also stores a public key that is certified by the vendor of the OS running on the communication apparatus 131 and is used to verify whether the external device is a device having passed the predetermined certification program. Principal portions of the hardware modules, such as various communication interfaces and the CPU 111, may be physically integrated on a single chip set.

Hardware Configuration of External Authenticator

Figure 3:
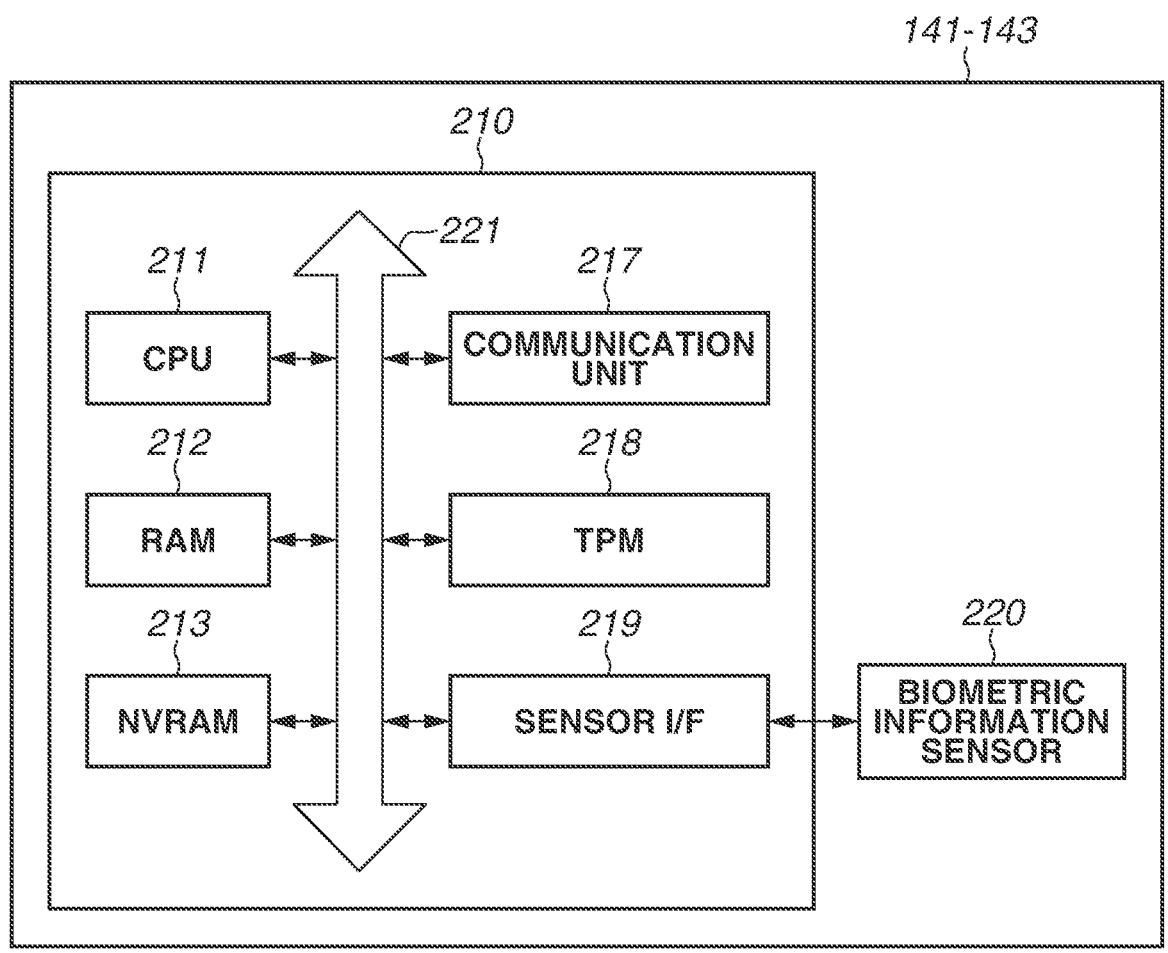
FIG. 3 is a block diagram illustrating a hardware configuration example of an external authenticator according to one embodiment.

Next, a hardware configuration example of the external authenticators 141 to 143 will be described with reference to FIG. 3. A control unit 210 including a CPU 211 controls the overall operation of the external authenticators 141 to 143. Hardware modules and interfaces included in the control unit 210 are connected via a system bus 221.

The CPU 211 loads control programs stored in a non-volatile RAM (NVRAM) 213, which is a non-volatile storage area, on a RAM 212, and performs various control operations related to authentication. The NVRAM 213 stores various data, such as a basic input/output (I/O) program. In the present example embodiment illustrates, a description will be given of an example case where a processor, the CPU 211, executes various control operations related to authentication, but instead any other mode can be employed. For example, instead of using a general-purpose processor, such as a CPU, an application-specific instruction set processor (ASIP) can be configured to perform an authentication control operation. Various control operations related to a private key and a control operation for generating a signature are implemented in cooperation with a TPM 218 to be described below. Some of the processes, such as data transmission and reception processes, are implemented using a hardware circuit and the like that are included in a communication unit 217 and operate in cooperation.

A sensor I/F 219 connects the control unit 210 and a biometric information sensor 220 to each other. The biometric information sensor 220 is a sensor for reading biometric information about the user. For example, the sensor I/F 219 measures a feature amount of a fingerprint, an iris, a vein, or the like of the user and detects biometric information.

In the present example embodiment, the biometric information sensor 220 is used as an example of a sensor for fingerprint authentication. However, the biometric information sensor 220 may be a different biometric information sensor, such as a camera for reading an iris of the user. The user causes the biometric information sensor 220 to read biometric information a plurality of times in preliminary biometric information registration processing. The CPU 211 generates biometric information feature amount data based on the biometric information obtained by executing the reading operation a plurality of times, and stores the generated feature amount data in the TPM 218. When an authentication request is received from the communication apparatus 131, the feature amount data stored in the TPM 218 is used to verify the personal identity of the user that has registered the biometric information. Upon receiving the authentication request, the corresponding authenticator performs a control operation, such as an operation of causing a light-emitting diode provided in a sensor portion to emit light, or a vibration operation using a vibrating motor (not illustrated), to prompt the user to perform a biometric information input. When biometric information is read, a coincidence between the read biometric information and the feature amount data is calculated. In a case where the coincidence is more than or equal to a predetermined threshold, it is determined that the personal identity of the user is verified.

The TPM 218 is a storage unit intended for processing and storing confidential information and thus has tamper-resistance for preventing stored data from being externally read. In various embodiments of the present disclosure, the TPM 218 stores feature amount data on biometric information to be used for authentication, a private key to be described below, and a certificate to be used for communication with the communication apparatus 131. Encryption and decryption of data using a certificate or a key, generation of a key pair, calculation of a hash value, digital signature generation processing, verification processing, and the like are also executed by the TPM 121 and the CPU 111 that operate in cooperation. In the present example embodiment, a public key that is certified by the vendor of the OS running on the communication apparatus 131 and is used to verify whether the external device is a device having passed the predetermined certification program is stored in the TPM 121 in a factory default state. While the present example embodiment described above illustrates a case where the private key to be used to verify whether the external device is a device having passed the predetermined authentication process is held in the TPM 218, the present invention is not limited to this case. For example, a TPM that stores and processes information for FIDO2 authentication and information about a signature, a key, or the like for general communication and a TPM that stores and processes information for a predetermined authentication may be provided separately. In this case, for example, an authentication chip including a TPM for the predetermined authentication is distributed to a vendor manufacturing an authenticator as a peripheral device from a vendor of an OS that has performed a predetermined certification, and the authentication chip is incorporated in the authenticator by the vendor that manufactures the authenticator.

The communication unit 217 is a communication interface using, for example, Bluetooth®, Bluetooth® Low Energy, NFC, and USB. In the case of the external authenticator 143, a USB communication interface is adopted. The external authenticator 143 includes a USB Type-C connector provided on the outside of a casing of the external authenticator 143. The user connects the connector portion of the external authenticator 143 to the port of the communication apparatus 131 described above and uses the external authenticator 143. On the other hand, in the case of the external authenticators 141 and 142, a wireless communication interface for, for example, Bluetooth® or Bluetooth® Low Energy is adopted. A single authenticator may include a plurality of communication interfaces. For example, a single authenticator may include both the USB interface and the NFC interface.

Software Configuration of Communication Apparatus 131

Figure 4:
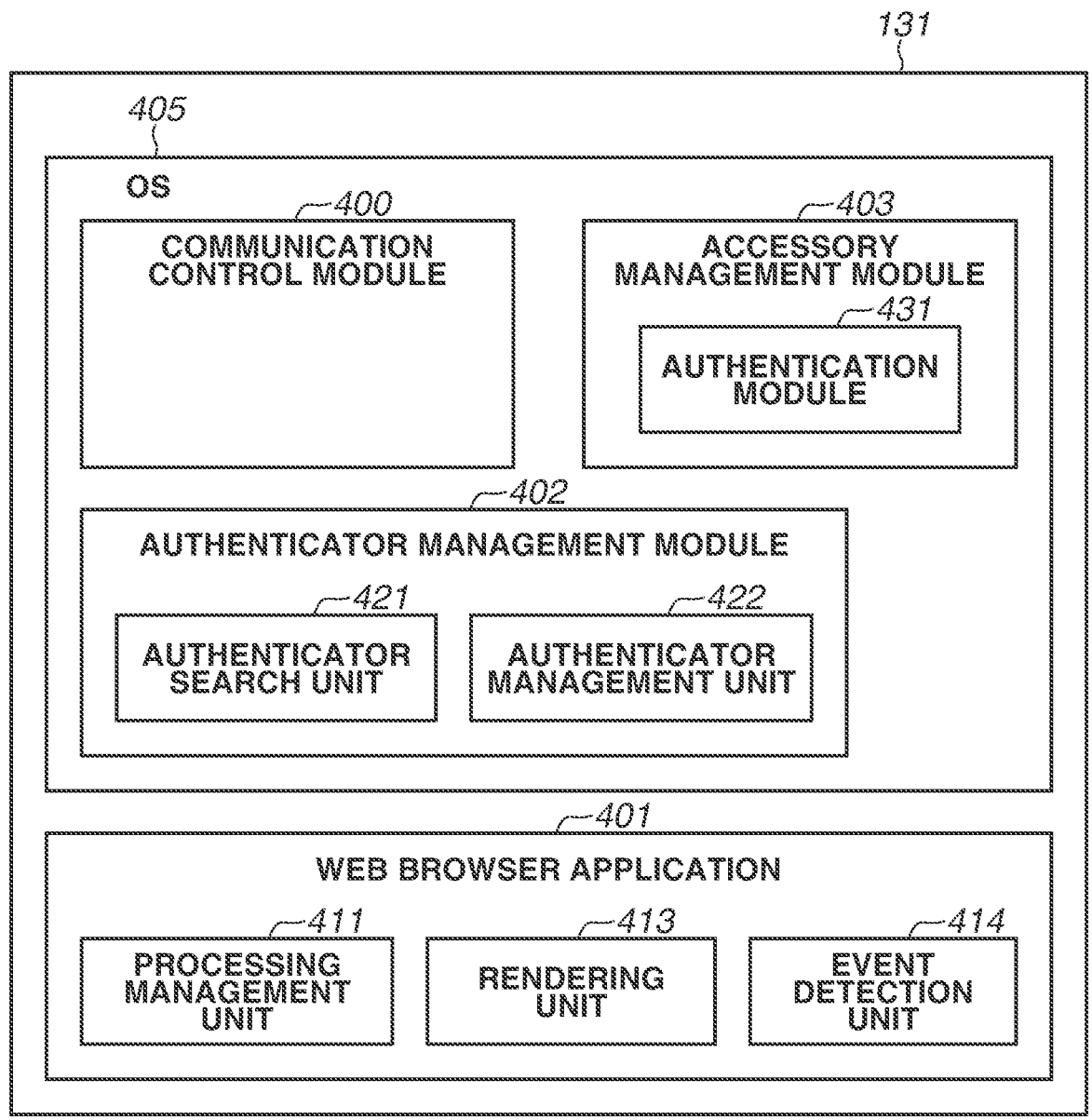
FIG. 4 is a block diagram illustrating a software configuration example of the communication apparatus according to one embodiment.

FIG. 4 is a block diagram illustrating a software configuration example of the communication apparatus 131. The modules and application illustrated in FIG. 4 indicate software components and are stored as programs in the storage 114 illustrated in FIG. 2. The programs are loaded on the RAM 112 at the time of executing the programs, and are executed by the CPU 111.

The OS 405 is basic software for controlling the overall operation of the communication apparatus 131, and includes a communication control module 400, an accessory management module 403, and an authenticator management module 402.

While the present example embodiment illustrates a case where the authenticator management module 402 and the accessory management module 403 are provided by the OS 405, the present invention is not limited to this case. All or some of the functions provided by each module may be provided by the web browser application 401. In this case, the web browser application 401 implements the functions in cooperation with the OS 405.

The communication control module 400 is a communication module for controlling various types of communications with an external device in an integrated manner. Examples of the various types of communications include USB, Bluetooth®, Bluetooth® LE, UWB, LTE, 5G, and IEEE 802.11 standards.

The accessory management module 403 manages external devices (also referred to as accessories) that are currently connected to the communication apparatus 131 or have been previously connected to the communication apparatus 131. The accessory management module 403 includes an authentication module 431 for communicating with an external device and verifying whether the external device is a device having passed a predetermined authentication process certified by the OS vendor.

The vendor of the OS 405 has a predetermined certification program on its own for operation checking and examination in terms of safety, compatibility, stability, and the like, for external accessory developers. A certification logo is given to an external device having passed the predetermined certification program. The external device having passed the predetermined certification program is provided with a module for communicating with the authentication module 431 included in the OS of the communication apparatus 131 and verifying whether the external device is a device having passed the predetermined certification program. The predetermined certification program is hereinafter also referred to simply as a predetermined authentication or the like. Examples of the predetermined certification program include Made For iPhone®/iPad®/iPod® (MFi) authentication provided by Apple® Inc. and Made For Google® authentication provided by Google® Inc.

Examples of accessories managed by the accessory management module 403 include the external authenticators 141 to 143, audio accessories, and microphones. An example of a device management table held in the accessory management module 403 will be described with reference to FIG. 5A.

A "device ID" field is for identification information for uniquely identifying each external device. In the "device ID" field, information indicating a connection method for connecting with the communication apparatus 131 and the type of each external device, and a result of verification of whether the external device is a device having passed the predetermined authentication certified by the OS vendor are stored in association with the device ID.

A "connection method" field is for an interface to which each external device is connected. In the "connection method" field, information indicating Bluetooth®, USB, NFC, or the like is stored. A "connection method 2" field is for information for uniquely identifying a connection port or the like for communicating with each external device. For example, in the case of the authenticator that is connected via a USB, a USB port identifier or an address is stored. In the case of the authenticator that is paired by Bluetooth®, a Bluetooth® connection session ID or an address is stored. In the case of an audio device identified with the device ID "e00d11b2-51ed-4534-8111-462780647857", while Bluetooth® is used as the connection method, the audio device is not currently paired. Thus, N/A is stored as the connection ID. In the case of the authenticator identified with the device ID "2ae22ccf-e94d-4d65-b767-2366728b62e9", while Bluetooth® LE is used as the connection method, the authenticator is currently in an unconnected state. Thus, "Available" indicating that the authenticator is connectable is stored as the connection method. "Available" indicates a state where advertising packets locally broadcasted by the authenticator at a predetermined cycle are received by the communication apparatus 131 and the communication apparatus 131 detects that the authenticator is in the proximity of the communication apparatus 131. In this state, a bidirectional communication is not established between the communication apparatus 131 and the authenticator. Accordingly, N/A indicating "not executed" is stored in a "predetermined authentication execution" field that indicates the result of execution of the predetermined authentication.

A "type" field is for the type of each external device. For example, when Bluetooth® is used as the connection method, a Bluetooth® profile is acquired from the external device, the type of the external device is identified based on the profile, and type information is stored. The information managed by the accessory management module 403 is not limited to information illustrated in FIG. 5A. For example, information acquired via communication with an accessory, such as the name of a connected accessory, may also be stored.

Next, the authenticator management module 402 will be described. The authenticator management module 402 includes an authenticator search unit 421 and an authenticator management unit 422.

The authenticator search unit 421 operates in cooperation with the accessory management module 403 and the communication control module 400 and searches for authenticators as selection candidates. First, the authenticator search unit 421 sends a search request to the accessory management module 403 to search for external devices. The accessory management module 403 that has received the search request sends a request for searching for external devices to the communication control module 400. The communication control module 400 searches for Bluetooth® devices and Bluetooth® Low Energy devices. The connection state of a USB device or the like is rescanned. After completion of the search, the communication control module 400 sends information about the external devices found as a result of the search to the accessory management module 403. The accessory management module 403 updates the device management table illustrated in FIG. 5A based on the search result. For the external devices already connected to the communication apparatus 131, the authentication module 431 performs the predetermined authentication for determining whether the accessory is an accessory having passed the predetermined certification provided by the vendor of the OS 405. This operation will be described in detail below. The predetermined authentication execution result is stored in the device management table.

Then, the accessory management module 403 sends information about the external devices whose type is an authenticator as a response to the authenticator management module 402.

The authenticator management unit 422 of the authenticator management module 402 that has received the response updates the device management table for managing authenticators as selection candidates. The authenticator search unit 421 sends a request for information about an internal authenticator included in the communication apparatus 131 to the OS 405. In a case where the communication apparatus 131 includes the internal authenticator, the OS 405 sends information about the internal authenticator included in the communication apparatus 131 in response to the request.

FIG. 5B illustrates an example of the device management table for managing authenticators by the authenticator management unit 422. FIG. 5B illustrates the device management table including four authenticators described above with reference to FIG. 5A and one internal authenticator found by the search.

While the present example embodiment illustrates an example of a management method in which various pieces of information about authenticators are stored in the table illustrated in FIG. 5B, the management method is not limited to this example. For example, the authenticator management unit 422 may be configured to manage only device IDs as a main key for uniquely identifying information. In this case, the authenticator management unit 422 gets access to the entity of various information about authenticators managed by the accessory management module 403 based on the device ID, as needed, and refers to the information about the authenticators.

The authenticator management unit 422 also includes a function for receiving a request for authentication from the web browser application 401 or the like. Specifically, the authenticator management unit 422 sends a notification indicating a list of authenticators as selection candidates to a web browser, and manages authentication processes in an integrated manner using the authenticator selected when a selection operation is performed via the web browser.

Next, the web browser application 401 will be described. The user can use various functions of the cooperative service 130 by accessing the cooperative service 130 through the web browser application 401.

A rendering unit 413 interprets web content data acquired from the cooperative service 130 via the communication control module 400 and the wireless communication unit 117, and displays a web screen on the operation unit 116. An event detection unit 414 receives an event of a user operation performed on the operation unit 116, and sends a notification indicating the event to a processing management unit 411. The processing management unit 411 controls the overall processing for transmitting a request to the cooperative service 130 and communicating with the authenticator management unit 422. The processing management unit 411 also includes an interpreter for processing a program code, such as JavaScript®.

Software Configuration of External Authenticator

Figure 6:
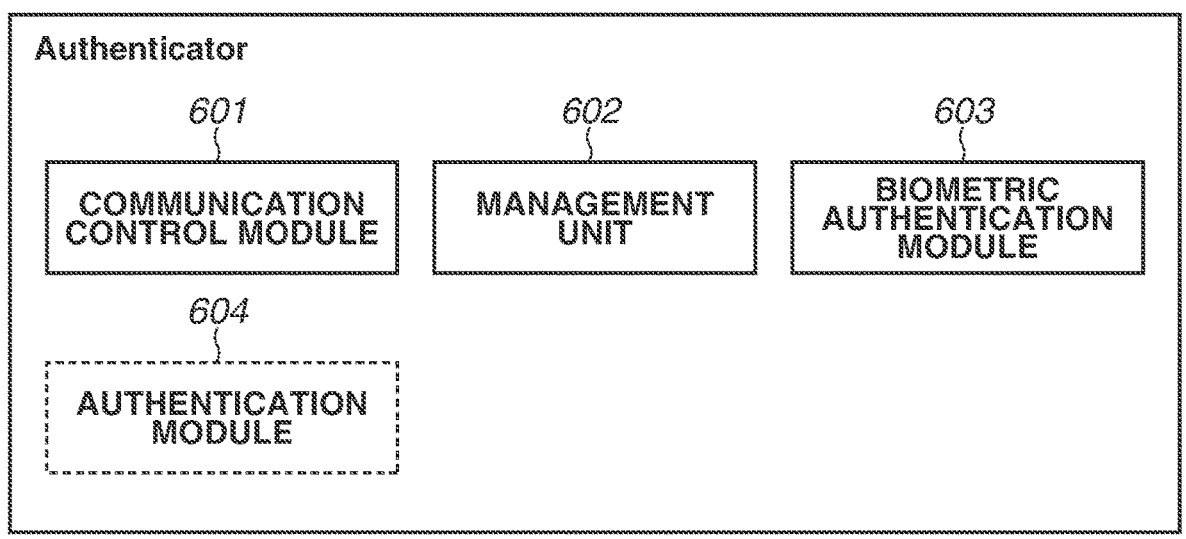
FIG. 6 is a block diagram illustrating a software configuration example of the external authenticator according to one embodiment.

Next, a function provided by each of the external authenticators 141 to 143 will be described with reference to FIG. 6. FIG. 6 illustrates a software configuration example of each of the external authenticators 141 to 143. Components illustrated in FIG. 6 indicate software components and are stored as programs in the NVRAM 213 illustrated in FIG. 3. These programs are loaded on the RAM 212 at the time of executing the programs, and are executed by the CPU 211.

Each of the external authenticators 141 to 143 includes a communication control module 601, a management unit 602, a biometric authentication module 603, and an authentication module 604. The communication control module 601 is a module for managing the connection and communication with the communication apparatus 131 in an integrated manner.

The management unit 602 processes an authentication request for online authentication received via the communication control module 601. The authentication request for online authentication includes information about a roleplay (RP) server, a policy, and a challenge for challenge response authentication. Upon receiving the authentication request for online authentication, the management unit 602 sends a request for biometric authentication processing to the biometric authentication module 603. The biometric authentication module 603 prompts the user to present biometric information. The biometric information acquired using the biometric information sensor 220 is transmitted to the TPM 218. The TPM 218 verifies the personal identity of the user that has registered the biometric information based on the feature amount data and the acquired biometric information. In a case where the personal identity of the user is verified, the TPM 218 signs the challenge using a private key for the authentication corresponding to a request source of the online authentication, and sends a notification indicating a signing result to the management unit 602. The management unit 602 transmits the signing result to the communication apparatus 131. The signing result is sent to the RP server of the cooperative service 130 through the communication apparatus 131. The RP server verifies the signature using a public key registered in pre-registration processing. In a case where the verification is successful, the cooperative service 130 provides the user with various services.

The authentication module 604 indicated by a broken line in FIG. 6 is a module included in the external device having passed the predetermined authentication certified by the vendor of the OS 405. In the present example embodiment, an external device that has not passed the predetermined authentication does not include the authentication module 604.

The authentication module 604 receives the authentication request for the predetermined authentication received from the communication apparatus 131 via the communication control module 601 and processes the authentication request. The authentication request is a request that is issued by the authentication module 431 of the communication apparatus 131 and includes a challenge for challenge response authentication. The authentication module 604 operates in cooperation with the TPM 218 and generates a challenge with a signature using a private key for the predetermined authentication that is stored in a factory default state. Then, the authentication module 604 sends the generated challenge with the signature as a response to the communication apparatus 131. The authentication module 431 of the communication apparatus 131 that has received the response verifies whether the external device is a device having passed the predetermined certification, based on the challenge with the signature. The verification result is stored in the device management table managed by the accessory management module 403 as illustrated in FIG. 5A.

On the other hand, the external device is a device that has not passed the predetermined certification does not include the authentication module 604. Accordingly, even in a case where the authentication request for the predetermined authentication is received from the communication apparatus 131, the external device cannot appropriately process the authentication request. The communication apparatus 131 can check whether the external device can appropriately send a response to the authentication request and whether the external device is a device having passed the predetermined certification, based on the result of verifying the challenge with the signature.

Authenticator Presentation Method

The external device having passed the predetermined certification can also be referred to as an accessory that is guaranteed in terms of safety, compatibility, stability, and the like by the OS vendor. On the other hand, an accessory that is not guaranteed in terms of safety, compatibility, stability, and the like can deteriorate experience of the user using the communication apparatus connected with the accessory. Many users may wish to use guaranteed accessories in terms of external authenticators that hold important data, such as a credential, including biometric information, and a private key.

In view of the above-described circumstances, the present example embodiment provides a mechanism for enabling a user to easily identify an external device that has failed to pass a predetermined authentication when the user uses an authenticator. This mechanism will be described in detail below with reference to FIGS. 7 to 9.

Figure 7:
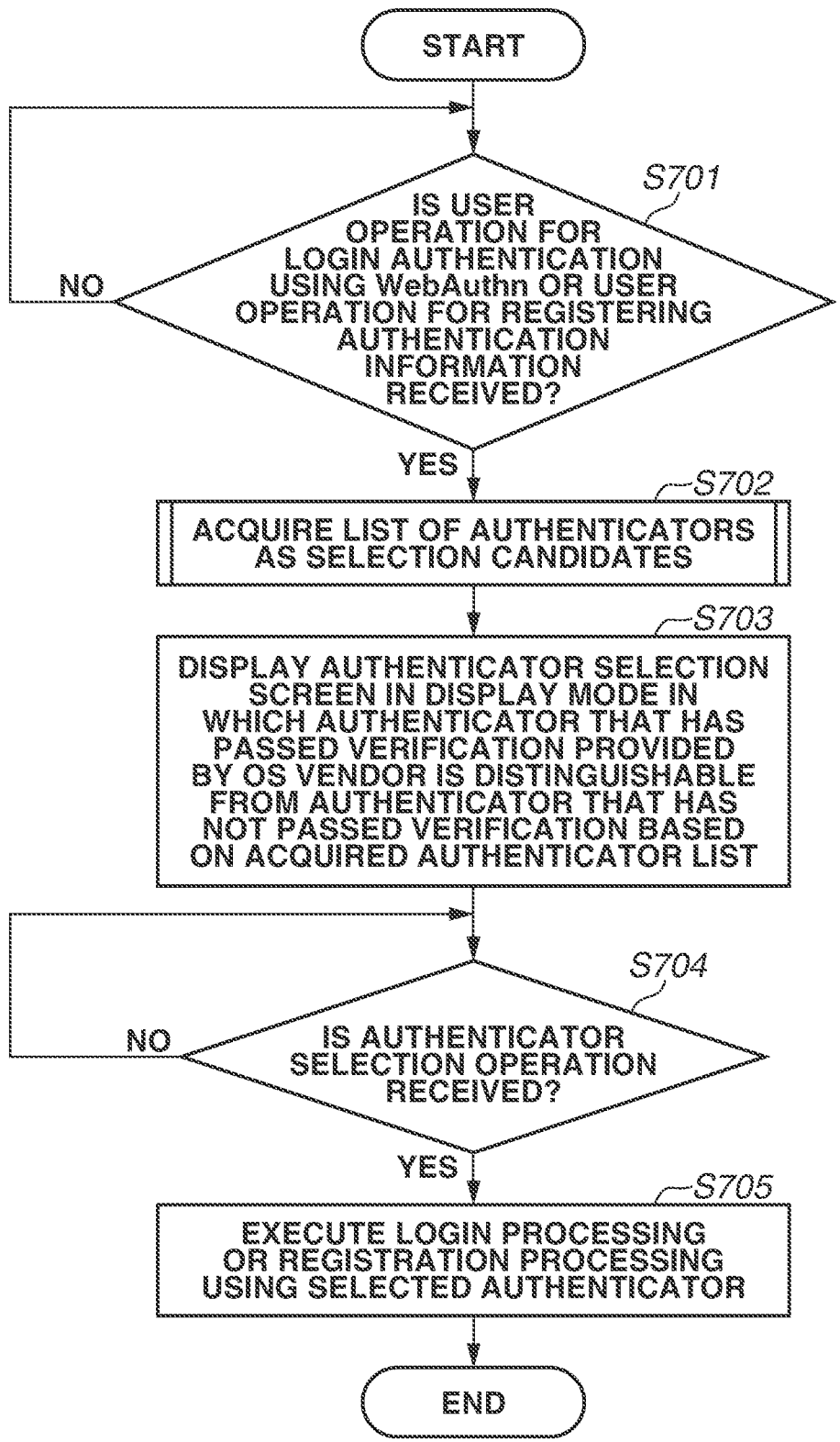
FIG. 7 is a flowchart illustrating an example of control processing to be executed by the communication apparatus according to one embodiment.
Figure 8:
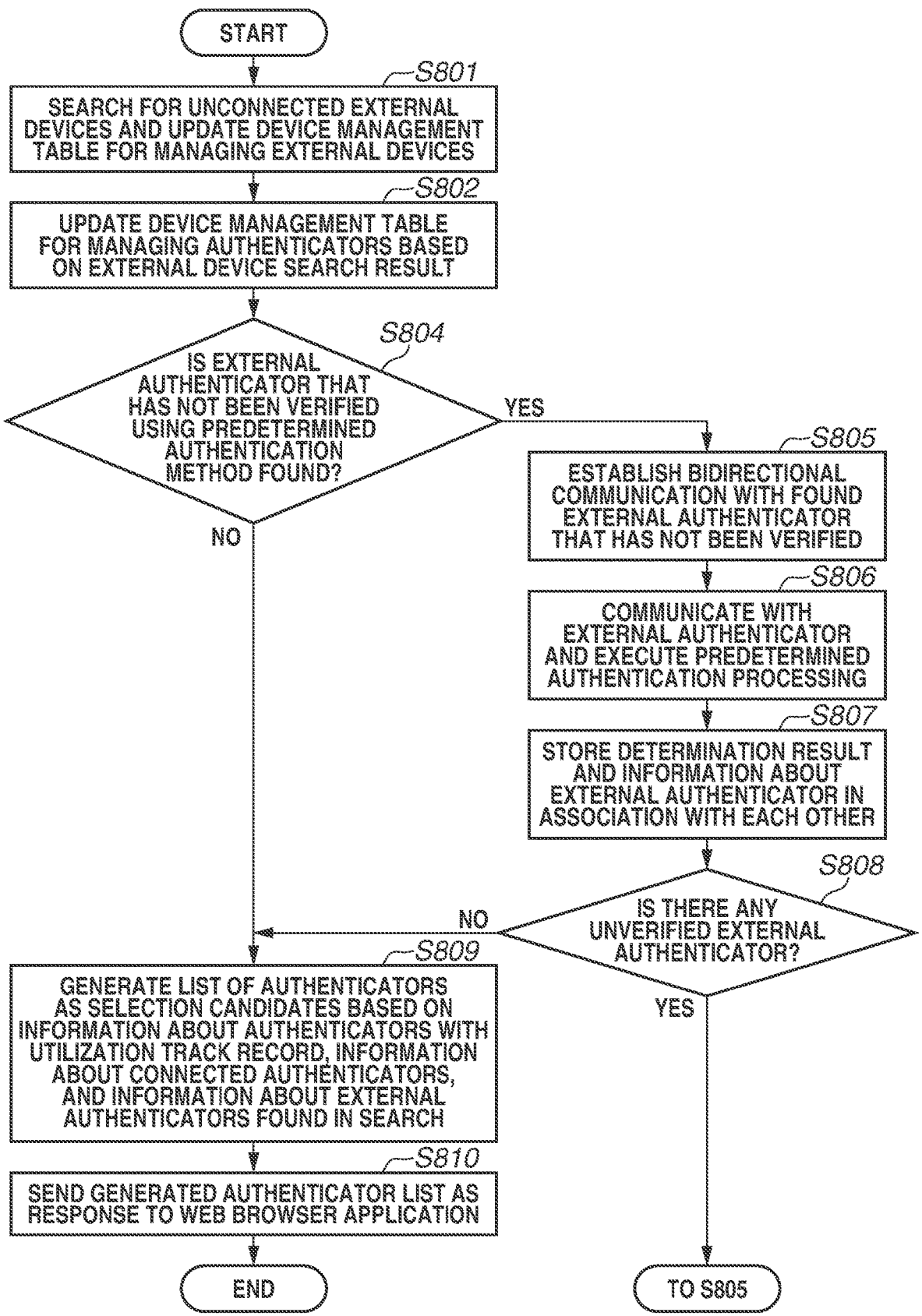
FIG. 8 is a flowchart illustrating an example of control processing to be executed by the communication apparatus according to one embodiment.

FIGS. 7 and 8 are flowcharts each illustrating a control operation that is executed by the communication apparatus 131. Each operation illustrated in the flowcharts of FIGS. 7 and 8 is implemented in such a way that programs for implementing the modules, software components, and application illustrated in FIG. 4 are loaded on the RAM 112 and the programs are executed by the CPU 111. To make clear the subject of each processing, the following description is given by using each module, each software component, or each application as the subject, as needed. Some of the processes implemented by the web browser application 401 illustrated in FIG. 7 are implemented in such a way that a program, such as JavaScript®, which is included in the web content acquired from the cooperative service 130 is executed by an interpreter.

Figure 9:
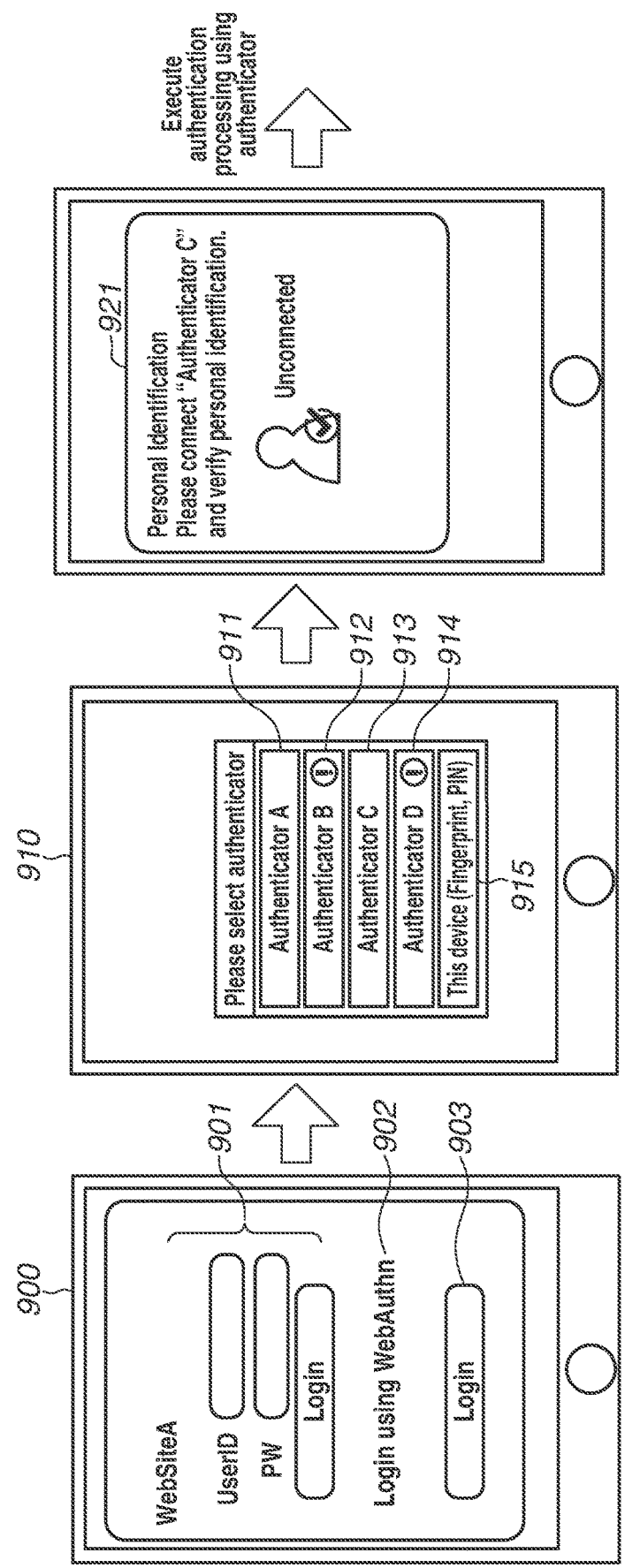
FIG. 9 is a diagram illustrating an example of screens to be displayed on an operation unit of the communication apparatus according to one embodiment.

FIG. 9 illustrates an example of a screen to be displayed on the operation unit 116 by the web browser application 401 or the OS 405. A screen 900 illustrates a login screen to be generated and displayed by the rendering unit 413 of the web browser application 401 based on web content data provided by the cooperative service 130.

A display item 901 is used for login processing using a user account (a user ID and a password). Information 902 is for notifying the user that the user can log in using WebAuthn. While the present example embodiment illustrates an example where the notification indicating that the user can log in using WebAuthn is displayed, the content of the notification is not limited to this example. For example, a notification indicating that the user can log in using FIDO2 may be displayed. In a case where biometric authentication is the requirement of an authentication policy, a notification indicating that the user can log in using biometric authentication may be displayed.

A login key 903 is a display item that is selected by the user when online authentication using FIDO2 is performed. The user uses the login key 903 to perform online authentication using an authenticator. This online authentication will be described in detail. Upon detecting that the login key 903 is selected, the event detection unit 414 of the web browser application 401 sends a notification indicating an event of selecting the login key 903 to the processing management unit 411. The processing management unit 411 that has received the notification indicating the selection event transmits an authentication request to the cooperative service 130 and receives data for authentication, including a challenge for challenge response authentication and a policy, as a response to the authentication request. The processing management unit 411 that has received the response operates in cooperation with the OS 405 and acquires a list of authenticators. The processing management unit 411 operates in cooperation with the rendering unit 413 and displays a selection screen 910 to select an authenticator to be used. On the selection screen 910, an icon for identifying an external authenticator failed to be verified as an external device having passed the predetermined certification is displayed. Display items 912 and 914 are examples of the icons for identifying the external authenticators failed to be verified as the external device having passed the predetermined certification. A display control for the screen will be described below with reference to the flowcharts of FIGS. 7 and 8.

The selection screen 910 is an example of a selection screen to be displayed when the list of the authenticators illustrated in FIG. 5B is displayed in the device management table of the authenticator management unit 422. On the selection screen 910, display items 911 to 914 corresponding to four respective external authenticators and a display item 915 corresponding to one internal authenticator are displayed. The user can select an authenticator to be used for online authentication through the selection screen 910. Upon detecting that any one of the authenticators is selected, the event detection unit 414 sends a notification indicating the selection event to the processing management unit 411. The processing management unit 411 that has received the notification indicating the selection event operates in cooperation with the rendering unit 413 and displays an authentication screen 921. The present example embodiment illustrates a case where the display item 913 is selected. Authenticator C is an authenticator corresponding to "4e332c46-e8e3-4f1a-aa76-73ee78413ac8" illustrated in FIG. 5B. This authenticator is an external authenticator to be connected via the USB that has been previously connected and is not currently connected to the communication apparatus 131. Accordingly, on the authentication screen 921, a message for prompting to connect the authenticator and a message for prompting to verify the personal identity of the user after the connection are displayed. When the authenticator is connected, the authenticator, the communication apparatus 131, and the cooperative service 130 operate in cooperation and execute online authentication using the authenticator.

While FIG. 9 illustrates a case where the selection screen is displayed during online authentication using FIDO2, the present invention is not limited to this case. A selection screen 910 is also displayed in a case where the communication apparatus 131 newly registers authentication information on the RP server. In the case of new registration, the authenticator, the communication apparatus 131, and the cooperative service 130 execute key pair generation and storage processing and processing of registering a public key on the RP server.

A display control for the selection screen will be described with reference to FIGS. 7 and 8. In step S701, the web browser application 401 determines whether a user operation for login authentication using WebAuthn or a user operation for newly registering authentication information on the RP server is received. In a case where the web browser application 401 determines that the user operation for login authentication using WebAuthn or the user operation for newly registering authentication information on the RP server is received (YES in step S701), the processing proceeds to step S702. On the other hand, in a case where the web browser application 401 determines that the user operation for login authentication using WebAuthn or the user operation for newly registering authentication information on the RP server is not received (NO in step S701), processing of waiting for an event of a user operation is performed. Although not illustrated because of space limitations, in a case where a user operation for screen transition is received, the web browser application 401 operates in cooperation with each module to change the screen, as needed.

Next, in step S702, the web browser application 401 requests the OS 405 to acquire a list of authenticators as selection candidates, and acquires the list of authenticators as selection candidates. The acquisition processing will be described with reference to FIG. 8. Each process illustrated in FIG. 8 is implemented by the OS 405 that has received the request from the web browser application 401.

In step S801, the authenticator search unit 421 operates in cooperation with the accessory management module 403 and the communication control module 400 and updates the device management table. Specifically, the authenticator search unit 421 sends a request for searching for external devices to the accessory management module 403. The accessory management module 403 that has received the search request sends a request for searching for external devices to the communication control module 400. The communication control module 400 searches for Bluetooth® devices and Bluetooth® Low Energy devices. After completion of search for rescanning connection states of USB devices or the like, the communication control module 400 sends information about external devices found as a result of the search to the accessory management module 403. The accessory management module 403 updates the device management table described above with reference to FIG. 5A based on the search result.

Next, in step S802, the authenticator management module 402 receives information about external devices whose type is an authenticator from the accessory management module 403. Then, the authenticator management unit 422 of the authenticator management module 402 updates the device management table for managing authenticators as selection candidates described above with reference to FIG. 5B. This update processing makes it possible to appropriately detect currently connected external authenticators and external authenticators that are currently in proximity to the communication apparatus 131.

In step S804, the authenticator management module 402 determines whether an external authenticator that has not been verified using a predetermined authentication method is found. In a case where an external authenticator that has not been verified using the predetermined authentication method is found (YES in step S804), the processing proceeds to step S805. On the other hand, in a case where an external authenticator that has not been verified using the predetermined authentication method is not found, i.e., in a case where verification of all the external authenticators is completed (NO in step S804), the processing proceeds to step S809.

In step S805, the authenticator management module 402 operates in cooperation with the communication control module 400 and establishes a bidirectional communication with the found unverified external authenticator. The communication control module 400 performs pairing processing with the external authenticator when Bluetooth® Basic Rate/Enhanced Data Rate (BR/EDR) is set as a communication method for communicating with the external authenticator. When Bluetooth® Low Energy is set as the communication method, the communication control module 400 establishes a connection with the external authenticator. In the present example embodiment, a description will be given of a case where the external authenticator is a generic attribute profile (GATT) server and the communication apparatus 131 is a GATT client.

In step S806, the authentication module 431 operates in cooperation with the communication control module 400, communicates with the external authenticator that has established the bidirectional communication, and executes predetermined authentication processing. Specifically, the authentication module 431 generates an authentication request for the predetermined authentication. The authentication request is a request including a challenge for challenge response authentication. The authentication module 604 of the external authenticator operates in cooperation with the TPM 218 and generates a challenge with a signature using a private key for the predetermined authentication which is stored in a factory default state. Further, the authentication module 604 sends the generated challenge with the signature as a response to the communication apparatus 131. The authentication module 431 that has received the response determines whether the external device has passed the predetermined certification based on the challenge with the signature. In a case where the authentication module 431 determines that the signature is appropriate as a result of verifying the signature with the public key for the predetermined authentication stored in the TPM 121, the authentication module 431 determines that the external device is a device having passed the predetermined certification. In a case where no response is received after a lapse of a predetermined period or in a case where the authentication module 431 determines that the signature is not appropriate as a result of verifying the signature with the public key corresponding to the private key, the authentication module 431 determines that the external device is a device that has not passed the predetermined certification. In the case of executing authentication processing by GATT communication using Bluetooth® Low Energy, the communication apparatus 131 writes a challenge into an authentication service provided by the GATT server of the external authenticator. The external authenticator that has detected writing of the challenge generates the challenge with a signature and stores the generated challenge with the signature as a characteristic for notification. The communication apparatus 131 accesses the characteristic for notification provided by the GATT server and reads the stored value, to acquire the challenge with the signature.

In step S807, the authenticator management module 402 stores the determination result from the authentication module 431 and the information about the external authenticators in association with each other in the device management table.

In step S808, the authenticator management module 402 determines whether there is any unverified external authenticator. In a case where the authenticator management module 402 determines that there is an unverified external authenticator (YES in step S808), the external authenticator is selected as a verification target and the predetermined authentication processing described above in steps S805 to S807 is performed. On the other hand, in a case where the authenticator management module 402 determines that there is no unverified external authenticator (NO in step S808), the processing proceeds to step S809.

In step S809, the authenticator management unit 422 generates a list of authenticators as selection candidates based on information about authenticators with utilization track record stored in the updated device management table, information about connected authenticators, and information about external authenticators found in the search. The list includes at least an authenticator display name (friendly name) and a predetermined authentication result.

In step S810, the authenticator search unit 421 sends the authenticator list generated by the authenticator management unit 422 as a response to the web browser application 401.

Referring again to FIG. 7, in step S703, the processing management unit 411 and the rendering unit 413 display a selection screen in a display mode in which an authenticator verified as an external device having passed the predetermined certification is distinguishable from an authenticator failed to be verified based on the acquired authenticator list. The selection screen 910 illustrated in FIG. 9 is an example of the selection screen.

Next, in step S704, the processing management unit 411 operates in cooperation with the event detection unit 414 and determines whether an authenticator selection operation is received. In a case where the authenticator selection operation is received (YES in step S704), the processing proceeds to step S705. In a case where the authenticator selection operation is not received (NO in step S704), processing of waiting for a selection operation is performed.

In step S705, the web browser application 401, the OS 405, and the selected authenticator operate in cooperation and execute processing of newly registering login authentication processing and authentication information for which the request is received in step S701.

The series of control operations described above enable the user to easily identify the external authenticator failed to pass the predetermined authentication, when the user uses the authenticator. Consequently, the configuration enhances experience of the user when the user uses the external authenticator.

Modified Examples

The first example embodiment described above illustrates a case where the web browser application 401 displays the selection screen and the authentication screen. However, the present invention is not limited to this case. The authenticator management module 402 of the OS 405 may be configured to provide a screen for authenticator selection processing and authentication processing. In this case, the OS 405 provides an online authentication API and a new registration API. The web browser application 401 calls an API for selecting an authenticator provided by the OS 405, and requests the OS 405 to execute authenticator selection processing and authentication processing. In this case, the web browser application 401 acquires signed data indicating the authentication processing result as a return value of the API, and transmits the return value to the RP server.

Figure 10A:
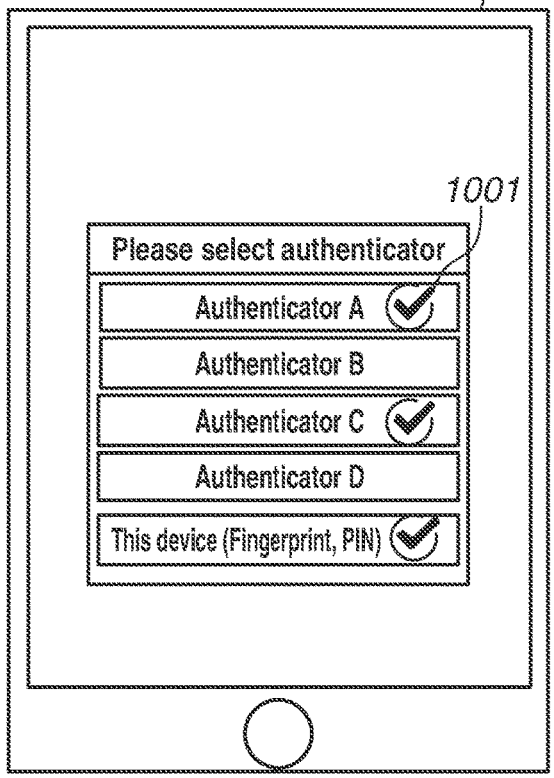
FIGS. 10A to 10D are diagram each illustrating a modified screen example to be displayed on the operation unit according to one embodiment.

The first example embodiment described above illustrates a case where an icon equivalent to a warning for calling user's attention to the authenticator failed to be verified as an external device having passed the predetermined certification is displayed. However, the identification method is not limited to this example. For example, the identification processing may be implemented by displaying an icon for indicating that the authenticator successfully verified as the external device having passed the predetermined certification is already authenticated. A selection screen 1000 illustrated in FIG. 10A is an example of a screen to be displayed in place of the selection screen 910. An icon 1001 is an example of an icon indicating that the external device is already authenticated.

Figure 10B:
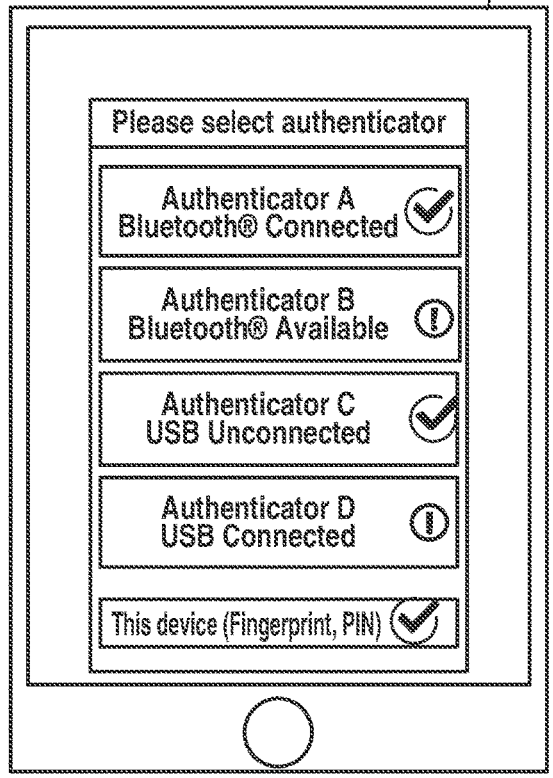

As illustrated in a selection screen 1010 of FIG. 10B, the selection screen can be modified in such a way that both an icon equivalent to a warning for calling user's attention and an icon for indicating that the external device is already authenticated are displayed. FIG. 10B illustrates a configuration in which a connection method and a current connection state are also displayed on the selection screen 1010 on which the user can intuitively select an authenticator. In this case, the OS 405 includes pieces of information about authenticators managed in the device management table illustrated in FIG. 5B in the list generated in step S809. The web browser application 401 is configured to display a status of each authenticator on the selection screen 1010 based on a connection method and a connection state included in the list.

Figure 10C:
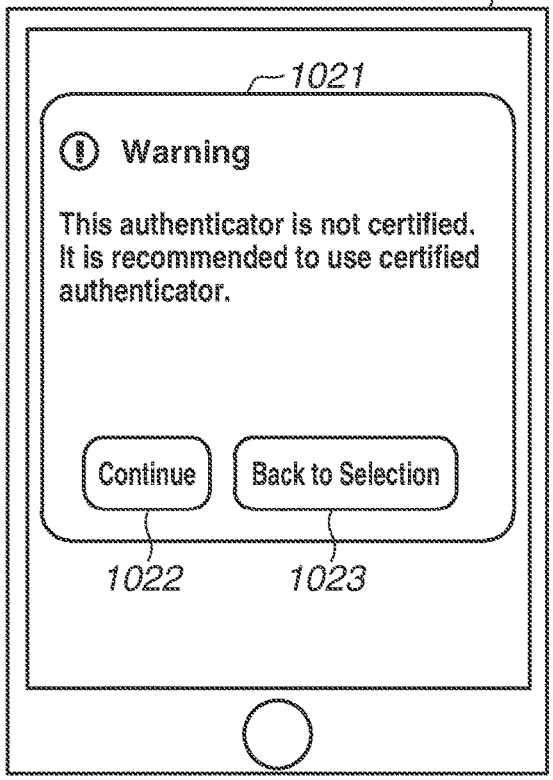
Figure 10D:

Further, a warning screen may be displayed when an authenticator failed to be verified as the external device having passed the predetermined certification is selected. A screen 1020 illustrated in FIG. 10C and a screen 1030 illustrated in FIG. 10D are examples of the warning screen.

The screen 1020 includes pop-up information 1021 indicating a warning. As the pop-up information 1021, a message indicating that the authenticator is not certified and it is recommended to use a certified authenticator is displayed. The screen 1020 also includes a "continue" key 1022 to be pressed when the authenticator failed to be verified as the external device having passed the predetermined certification are continuously used, and a "back to selection" key 1023 to be pressed when another authenticator is selected. In a case where it is detected that the "continue" key 1022 is selected, the communication apparatus 131 displays the authentication screen 921 as illustrated in FIG. 9. On the other hand, in a case where it is detected that the "back to selection" key 1023 is selected, the communication apparatus 131 displays the authenticator selection screen.

Pop-up information 1031 on the screen 1030 illustrates a modified example of the warning. As the pop-up information 1031, a message indicating that the authenticator is not certified and the authenticator can be used after adding the authenticator to exceptions is displayed. An "add to exceptions" key 1032 is a key for shifting to a setting screen (not illustrated) provided by the OS 405. On the setting screen (not illustrated), an uncertified authenticator can be added to a security exception target. The communication apparatus 131 performs a control operation in such way that a warning message is not displayed for the authenticator added to the security exception target even in a case where the authenticator is an authenticator failed to be verified as the external device having passed the predetermined certification.

Figure 11A:
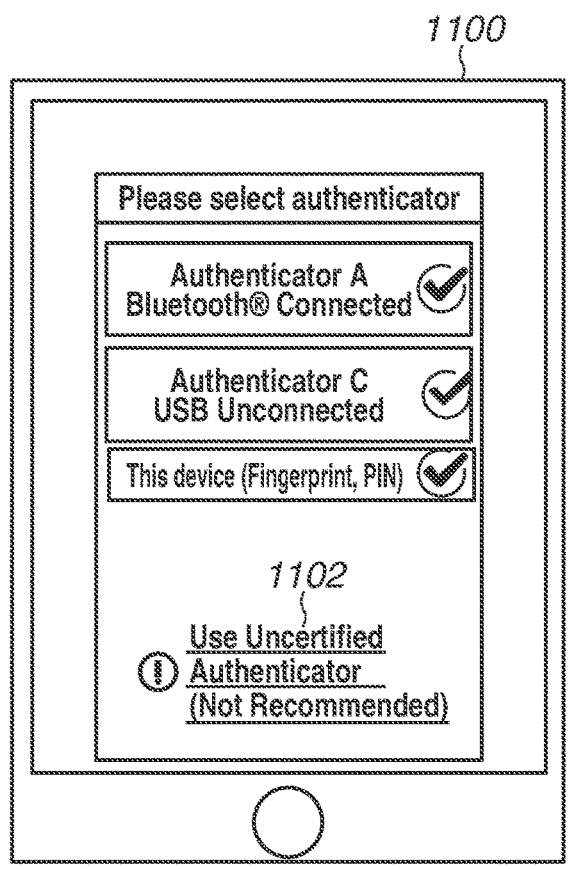
FIGS. 11A and 11B are diagrams each illustrating a modified screen example to be displayed on the operation unit.

The display of the selection screen can be modified into a selection screen 1100 illustrated in FIG. 11A. The selection screen 1100 illustrates a display mode in which only the internal authenticator and the authenticator verified as the external device having passed the predetermined certification are extracted and displayed. A key 1102 for selecting an authenticator that failed to be verified as the external device having passed the predetermined certification is displayed for a case of when the user wishes to use such an authenticator. In a case where it is detected that the key 1102 is selected, the communication apparatus 131 displays a selection screen including an authenticator failed to be verified as the external device having passed the predetermined certification. The selection screen may be a selection screen on which only authenticators failed to be verified as the external device having passed the predetermined certification are extracted, or may be a selection screen corresponding to the selection screen 910 illustrated in FIG. 9.

Figure 11B:
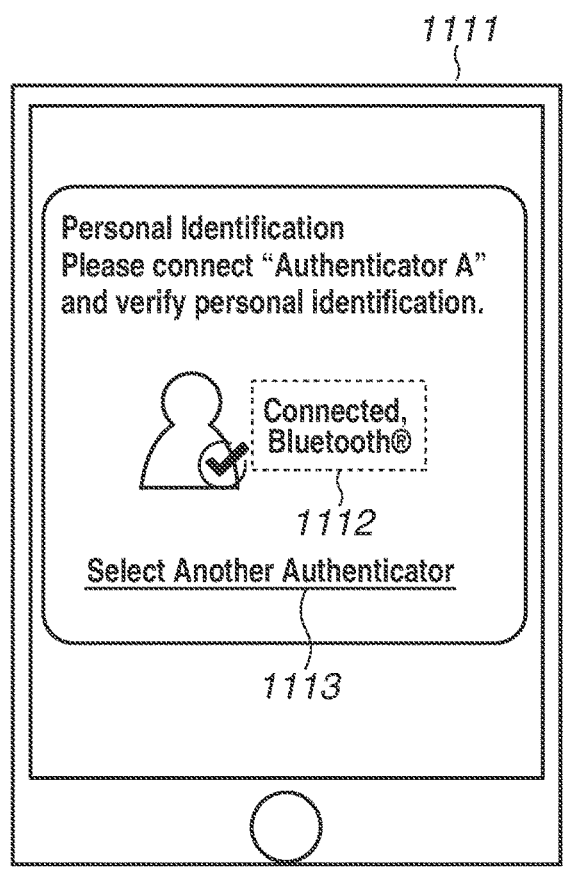

While the first example embodiment and the modified examples described above illustrate a case where the authenticator selection screen is displayed when a user operation for login authentication using WebAuthn or a user operation for newly registering authentication information on the RP server is received, the present invention is not limited to this case. The authenticator management unit 422 may be configured to store an authenticator used in the previous authentication and automatically select the authenticator used in the previous authentication as an authenticator to be used in the current authentication. In this case, in a case where the user operation for login authentication using WebAuthn or the user operation for newly registering authentication information on the RP server is received, an authentication screen 1111 on which the authenticator used in the previous authentication is selected is displayed as illustrated in FIG. 11B. On the authentication screen 1111, information 1112 indicating a connection state and a connection mode is displayed. A key 1113 is a key to be selected to change the authenticator to be used. In this case, upon detecting that the key 1113 is selected, the communication apparatus 131 may display the selection screen 910 or any one of the selection screens according to the modified examples as described above.

It is also possible to employ a configuration in which a setting operation for setting a frequently-used authenticator (default authenticator) is received via a setting screen (not illustrated). In this case, the authenticator management unit 422 stores settings for a default authenticator set based on a user operation. Further, upon receiving a user operation related to online authentication, the communication apparatus 131 automatically selects the default authenticator stored in the authenticator management unit 422 as the authenticator to be used in response to a request related to the current authentication, and displays an authentication screen.

Other Embodiments

Various embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-187609, filed Nov. 10, 2020, which is hereby incorporated by reference herein in its entirety.

What is claimed is:

1. A communication apparatus comprising: at least one memory that stores a set of instructions; and at least one processor that executes the instructions, the instructions, when executed, causing the communication apparatus to perform operations comprising, verifying, by communicating with an external device, whether the external device is an external device that passed a predetermined certification; and displaying a screen for selecting an authenticator, wherein on the screen, a display item for an external authenticator verified as the external device that passed the predetermined certification; a display item for an external authenticator that failed to be verified as the external device that passed the predetermined certification are displayed in a distinguishable manner based on a result of the verification; wherein the communication apparatus functions as an internal authenticator of the communication apparatus to provide authentication function; wherein the operations further comprise: searching for an external authenticator; and further displaying, on the screen, a display item for the external authenticator found as a result of the search and a display item for the internal authenticator.

2. The communication apparatus according to claim 1, wherein the display item for the external authenticator that failed to be verified as the external device that passed the predetermined certification is displayed with an icon indicating a warning, and
wherein the display item for the external authenticator verified as the external device that passed the predetermined certification is displayed in a display mode not including the icon indicating the warning.

3. The communication apparatus according to claim 2, wherein the display item for the external authenticator verified as the external device that passed the predetermined certification is displayed in a display mode including an icon different from the icon indicating the warning.

4. The communication apparatus according to claim 1, wherein the operations further comprise, in a case where the display item for the external authenticator that failed to be verified as the external device that passed the predetermined certification is selected on the screen, issuing a predetermined notification to a user.

5. The communication apparatus according to claim 4, wherein the predetermined notification is a notification indicating a warning.

6. The communication apparatus according to claim 1, wherein a challenge is transmitted to an external device and verification of whether the external device is the external device that passed the predetermined certification is performed based on a result of attempting to receive the challenge with a signature signed by the external device using a private key.

7. The communication apparatus according to claim 1, wherein the external device that passed the predetermined certification is an external device that has been determined to satisfy a condition specified by a vendor of an operating system of the communication apparatus as a result of a predetermined examination performed on the external device by the vendor.

8. The communication apparatus according to claim 1, further comprising:
a web browser; and
a storage,
wherein the storage stores information indicating an authenticator previously used in the communication apparatus, wherein the operations further comprise:
selecting, in a case where a user operation for authentication is received via the web browser, an authenticator corresponding to information indicating the previously-used authenticator stored in the storage as the authenticator to be used for the authentication, and displaying a second screen for performing authentication processing using the selected authenticator, and
wherein on the second screen, a display item for changing the authenticator to be used is displayed, and in a case where the display item for changing the authenticator to be used is selected, the screen is displayed.

9. A control method for a communication apparatus, comprising: verifying, by communicating with an external device, whether the external device is an external device that passed a predetermined certification; and displaying a screen for selecting an authenticator, wherein on the screen, a display item for an external authenticator verified as the external device that passed the predetermined certification and a display item for an external authenticator that failed to be verified as the external device that passed the predetermined certification are displayed in a distinguishable manner based on a result of the verification; wherein the communication apparatus functions as an internal authenticator of the communication apparatus to provide authentication function, and wherein the operations further comprise: searching for an external authenticator; and further displaying, on the screen, a display item for the external authenticator found as a result of the search and a display item for the internal authenticator.

10. A non-transitory computer-readable storage medium storing a program for causing a processor to execute a method of controlling a communication apparatus, the method comprising: verifying, by communicating with an external device, whether the external device is an external device that passed a predetermined certification; and displaying a screen for selecting an authenticator, wherein on the screen, a display item for an external authenticator verified as the external device that passed the predetermined certification and a display item for an external authenticator that failed to be verified as the external device that passed the predetermined certification are displayed in a distinguishable manner based on a result of the verification; wherein the communication apparatus functions as an internal authenticator of the communication apparatus to provide authentication function, and wherein the operations further comprise: searching for an external authenticator; and further displaying, on the screen, a display item for the external authenticator found as a result of the search and a display item for the internal authenticator.

* * * * *